July 30, 1940.  H. G. JUNGK  2,209,334
SALIENT-POLE ROTOR MEMBER FOR DYNAMO-ELECTRIC MACHINES
Filed March 21, 1939

WITNESSES:
C. J. Weller.
Thw. C. Groome.

INVENTOR
Herbert G. Jungk.
BY O. B. Buchanan
ATTORNEY

Patented July 30, 1940

2,209,334

UNITED STATES PATENT OFFICE 2,209,334

SALIENT-POLE ROTOR MEMBER FOR DYNAMO-ELECTRIC MACHINES

Herbert G. Jungk, Wilkinsburg, Pa., assignor to Westinghouse Electric & Manufacturing Company, East Pittsburgh, Pa., a corporation of Pennsylvania Application March 21, 1939, Serial No. 263,160

4 Claims. (Cl. 171—252)

My invention relates to the construction of a salient-pole rotor member for a dynamo-electric machine, and it has particular relation to a high-frequency, high-speed generator which is adapted for use as an auxiliary power-supply means on an airplane where space and high efficiency are at a premium. Such a generator is utilized for supplying small motor-driven pumps, blowers, superchargers, lights, and the like, and because of the high frequency and the preponderance of induction-motor loads, the power factor of the generator is commonly quite low, of the order of 60 to 80%. The low power factor makes it necessary to provide a large number of ampere-turns on the field winding, which is on the rotating member of the machine, and this requirement, coupled with the necessity for a large number of poles, makes the size of the rotor member the limiting feature which determines the size of the generator.

My present invention relates to a novel construction of such a rotor member, obtaining the highest possible space-factor for the field windings, coupled with the lightest-weight construction, and the greatest possible tightness and rigidity of all of the parts of the rotor member, particularly rigidity with respect to angular acceleration and deceleration.

A more specific object of my invention is to provide a rotor-construction comprising a plurality of separate salient pole-pieces each having an integral spool-portion at its outer end and a segmental inner end; with a field-coil directly wound on each spool-portion before the rotor member is assembled, and with the entire assembly of salient pole-pieces firmly arch-bound together by means of shrink rings which tightly encircle lateral shoulders which are provided on the segmental inner ends of respective salient pole-pieces.

Figure 1:
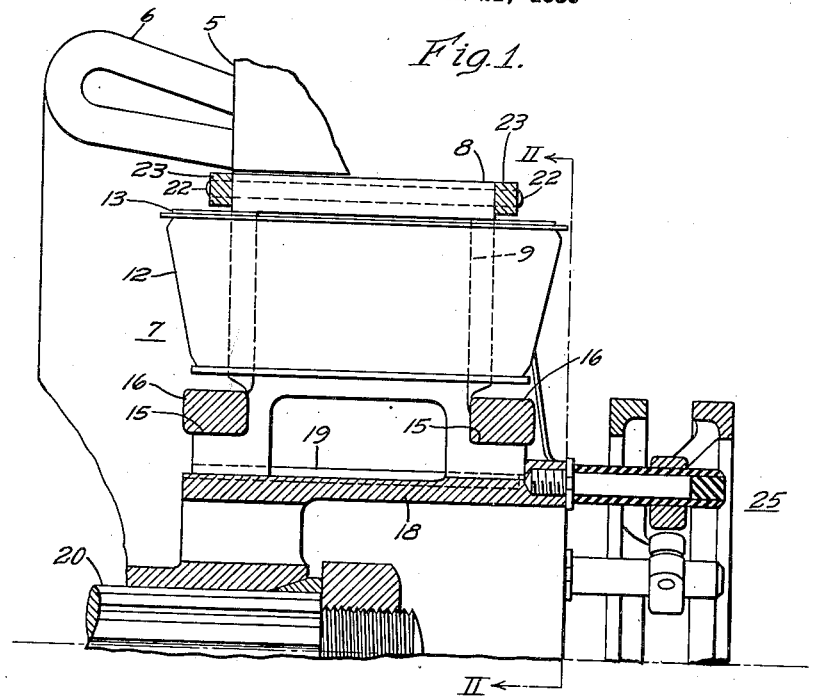
Figure 2:
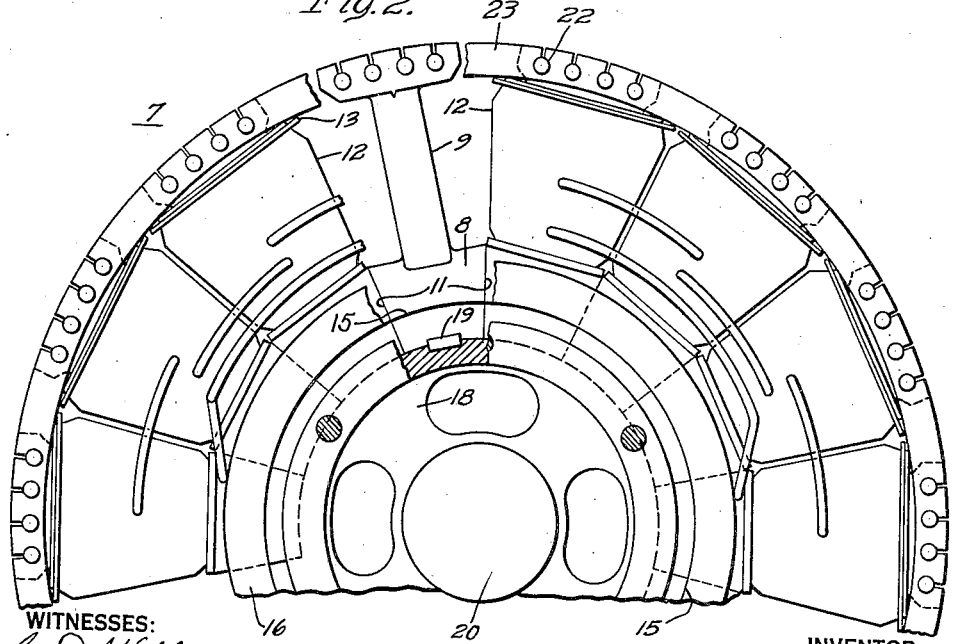

With the foregoing and other objects in view, my invention consists in the constructions, combinations, elements and methods hereinafter described and claimed and illustrated in the accompanying drawing, wherein:

Figure 1 is a fragmentary longitudinal sectional view of a dynamo-electric machine embodying my invention, and Fig. 2 is a sectional end view thereof with parts broken away to show the construction, the section plane being indicated at II—II in Fig. 1.

The particular machine shown in Figure 1 is a three-phase, 400-cycle generator comprising a stator member 5 having polyphase windings 6, and a rotor member 7 which constitutes the subject-matter of my present invention. The rotor member 7 constitutes the field member of the machine, and it is made up of fourteen pole-members each of which, according to my invention, consists of a separate salient pole-piece 8 which is formed from a steel billet. Each of the salient pole-pieces 8 is integrally provided, at its outer end, with a spool-portion 9 comprising inner and outer end-flanges joined by a shank-portion, as shown in Fig. 2. The inner end of each of the salient pole-pieces is machined, as shown in Fig. 2, with the lower sides ground to an angle of 360°/14, to form a segmental inner end 11.

Before the several separate salient pole-pieces 8 are assembled, each pole-piece is wound with a coil 12 of properly insulated wire. Before the coil 12 is wound in place, a washer 13 is applied to the outer end of the spool 9 for the purpose of supporting the coil 12 against centrifugal forces, said washer being made of stainless steel, brass or other non-magnetic material so as to avoid flux-leakage, which it is important to avoid.

The coil 12 is directly and permanently wound on its spool 9 as a mandrel, being tightly wound on the shank of the spool and shellacked thereto, during the winding process, so that the whole constitutes a rigid, unitary, non-displaceable mass which is much more resistant against displacement, and much more saving in space, than would be the case in the event of the use of a usual form-wound coil which is wound as a separate coil and then slid over the shank of the pole-piece, one end of which would have to be left open for the purpose, and which would result in a construction requiring additional space for wedging in the coil and for securing the removable end of the spool. It will be noted that the coil 12 is wound with sloping sides, so as to make a full utilization of the available space, as will be seen from Fig. 2.

Each side of the segmental inner end 11 of each salient pole-piece or core-segment 8, as shown in Fig. 1, is provided with a lateral shoulder 15, preferably disposed close to the inner end of the core-segment; and when all fourteen of the core-segments 8 are assembled together, after having each been wound with its coil 12, the fourteen lateral shoulders 15 at each side of the rotor member constitute an annular shoulder which is tightly embraced by a shrink-ring 16. The two shrink-rings 16 thus tightly bind the segmental portions 11 together, in an arch-bound formation, producing, in effect, a rigid, unitary rotor-structure which is much more resistant to shocks, vibrations, centrifugal force, and violent alterations in angular velocity, than the heretofore-conventional bolts or dovetails which have been utilized to assemble the rotor pole-pieces. The inner ends or bottoms of the respective segmental inner ends 11 of the assembled unitary, arch-bound rotor member are so shaped as to provide a substantially cylindrical seating-surface which seats on a cylindrical spider 18, to which the rotor member is keyed at 19, the spider being directly mounted on the shaft 20 of a gasoline engine or other prime-mover (not shown).

In the particular form of generator shown in the drawing, the rotor member is provided with a damper winding which is formed by damper bars 22 which are carried in the pole-faces of the pole-pieces 8, and which are joined, at their ends, to two integral damper-rings 23. The two damper-rings 23 are each made of a strip of metal, bent into ring-formation and silver soldered, at its ends, into a solid, integral ring. These damper-rings are bored to receive the damper bars 22, so that the damper bars extend through the damper rings. As shown in Fig. 1, the ends of the damper bars 22 are then peened over, and finally fused to the damper bar by being touched with a welding electrode (not shown). The foregoing damper-winding construction thus avoids all bolts and fasteners, so that it is of a minimum weight and of a maximum strength to withstand the high speeds and vibrational stresses to which the airplane generator is subjected.

Mounted on one side or end of the spider 18 is a collector-ring structure 25 for conducting current to and from the exciting windings 12. The particular details of the collector-ring structure constitute the subject-matter of my copending application, Serial No. 263,161, filed March 21, 1939.

While I have shown my invention in but a single form of embodiment which is at present preferred by me, I wish it to be understood that such showing is intended only by way of illustration and not by way of limitation, since many changes may be made by those skilled in the art without departing from the essential spirit of my invention. I desire, therefore, that the appended claims shall be accorded the broadest construction consistent with their language and the prior art.

I claim as my invention:

1. A salient-pole rotor member for a dynamo-electric machine, comprising a plurality of $N$ separate salient pole-pieces, each salient pole-piece being a solid piece of magnetizable metal having a spool-portion at its outer end and a segmental portion at its inner end, each segmental portion having two flat, segment-forming ends having an appropriate angle therebetween, and each salient pole-piece also having a lateral shoulder on at least one side, a coil permanently wound on, and adhesively joined to, each spool-portion, the $N$ salient pole-pieces being assembled with the flat, segment-forming ends of successive segmental portions in abutment with each other, and at least one shrink-ring tightly encircling all of the lateral shoulders on its side of the rotor member to firmly arch-bind the segmental portions of all of the pole-pieces to form, in effect, a rigid, unitary rotor member, the inner ends of the respective segmental portions, in the assembled device, being so shaped as to provide a substantially cylindrical seating-surface for the assembled motor member.

2. A salient-pole rotor member for a dynamo-electric machine, comprising a plurality of $N$ separate salient pole-pieces, each salient pole-piece being a solid piece of magnetizable metal having a spool-portion at its outer end and a segmental portion at its inner end, each segmental portion having two flat, segment-forming ends having an appropriate angle therebetween, and each salient pole-piece also having a lateral shoulder on at least one side, a coil permanently wound on each spool-portion, each spool-portion having an inner end-flange and an outer end-flange for holding the coil in place, said inner and outer end-flanges being non-removable in the finished condition of each wound pole-piece, the $N$ salient pole-pieces being assembled with the flat, segment-forming ends of successive segmental portions in abutment with each other, and at least one shrink-ring tightly encircling all of the lateral shoulders on its side of the rotor member to firmly arch-bind the segmental portions of all of the pole-pieces to form, in effect, a rigid, unitary rotor member, the inner ends of the respective segmental portions, in the assembled device, being so shaped as to provide a substantially cylindrical seating-surface for the assembled rotor member.

3. A rotor member for a dynamo-electric machine, comprising a plurality of $N$ separate core-segments, each core-segment being a solid piece of magnetizable metal having two flat, segment-forming ends having an appropriate angle therebetween, and also having a lateral shoulder on at least one side, said lateral shoulder being disposed close to the inner end of each core-segment, the $N$ core-segments being assembled with the flat, segment-forming ends of successive core-segments in abutment with each other, and at least one shrink-ring tightly encircling all of the lateral shoulders on its side of the rotor member to firmly arch-bind the core-segments to form, in effect, a rigid, unitary rotor member, the inner ends of the respective core segments, in the assembled device, being so shaped as to provide a substantially cylindrical seating-surface for the assembled rotor member.

4. A salient-pole rotor member for a dynamo-electric machine, comprising a plurality of $N$ separate salient pole-pieces, each salient pole-piece being a solid piece of magnetizable metal having a spool-portion at its outer end and a segmental portion at its inner end, each segmental portion having two flat, segment-forming ends having an appropriate angle therebetween, each segmental portion also having a lateral shoulder on each side thereof, a coil permanently wound on each spool portion, the $N$ salient pole-pieces being assembled with the flat, segment-forming ends of successive segmental portions in abutment with each other, and two shrink-rings, one on each side of the rotor member, each shrink-ring tightly encircling all of the lateral shoulders on its side of the rotor member to firmly arch-bind the segmental portions of all of the pole-pieces to form, in effect, a rigid, unitary rotor member, the inner ends of the respective segmental portions, in the assembled device, being so shaped as to provide a substantially cylindrical seating-surface for the assembled rotor member.

HERBERT G. JUNGK.